(12) United States Patent
Lin

(10) Patent No.: US 6,795,891 B2
(45) Date of Patent: Sep. 21, 2004

(54) SYSTEM AND METHOD OF COMPOSING AND DECOMPOSING A ROM IMAGE

(75) Inventor: Frank Lin, Taipei (TW)

(73) Assignee: Penbex Data Systems, Inc. (TW)

( * ) Notice: Subject to any disclaimer, the term of this patent is extended or adjusted under 35 U.S.C. 154(b) by 209 days.

(21) Appl. No.: 10/147,956

(22) Filed: May 15, 2002

(65) Prior Publication Data

US 2003/0088709 A1 May 8, 2003

(30) Foreign Application Priority Data

Nov. 6, 2001 (TW) .......................................... 90127593 A

(51) Int. Cl.$^7$ .............................................. G06F 12/00
(52) U.S. Cl. ...................................... 711/103; 713/100
(58) Field of Search ................................. 711/103, 170, 711/161–162; 707/205; 713/2, 100; 717/162, 168

(56) References Cited

U.S. PATENT DOCUMENTS

| | | | | |
|---|---|---|---|---|
| 5,339,406 A | * | 8/1994 | Carney et al. ................. | 714/45 |
| 5,594,903 A | * | 1/1997 | Bunnell et al. ............. | 717/162 |
| 5,598,563 A | * | 1/1997 | Spies ............................. | 713/2 |
| 5,734,822 A | * | 3/1998 | Houha et al. ................ | 717/167 |
| 5,812,848 A | * | 9/1998 | Cohen ......................... | 719/331 |
| 6,424,975 B1 | * | 7/2002 | Walter et al. ............... | 707/200 |
| 6,530,077 B1 | * | 3/2003 | Marsh ......................... | 717/131 |

OTHER PUBLICATIONS

The resource relocation technique in handheld devices, Jun. 1999, IBM, vol. No. 42, issue No. 422.*

* cited by examiner

Primary Examiner—Nasser Moazzami
(74) Attorney, Agent, or Firm—Martine & Penilla, LLP

(57) ABSTRACT

A decomposable ROM image sequentially including an OS header corresponding to an OS image, the OS image, a non-OS header corresponding to a non-OS image and the non-OS image. To compose the decomposable ROM image, the OS header, which includes OS size information of the OS image and the non-OS header, which includes non-OS size information of the non-OS image are created first. Then, the OS header, the OS image, the non-OS header and the non-OS image are sequentially combined. To decompose the decomposable ROM image, the OS image is retrieved from the ROM image according to the OS size information obtained from the OS header. The non-OS image is then retrieved from the ROM image according to the non-OS size information obtained from the non-OS header.

25 Claims, 5 Drawing Sheets

SYSTEM AND METHOD OF COMPOSING AND DECOMPOSING A ROM IMAGE

BACKGROUND OF THE INVENTION

1. Field of the Invention

The invention relates to a system and method of composing and decomposing a decomposable read-only memory (ROM) image.

2. Description of the Related Art

A hand-held electronic device can store applications in its internal memory such as a dynamic random access memory (DRAM), or in an expansion card such as a secure digital (SD) card, a compact flash (CF) card or a multi-media card (MMC). To expand the functions or capabilities of the electronic device, a user can download applications via a network and store the applications in the internal memory or in the expansion card, and then use the operation system (OS) of the electronic device to execute the applications. The user can also download text files, databases, images, libraries, drivers or other data.

A disadvantage of the above-mentioned technique is that when the electronic device is reset or not powered, or when the expansion card storing the downloaded applications, programs or data is not inserted in the electronic device, the downloaded applications, programs or data cannot be retained. Therefore, the user has to download the applications, programs or data again after resetting or turning off the electronic device.

Another disadvantage is that the user can only expand the capabilities of the electronic device during the runtime of the OS. In other words, to expand the capabilities of the electronic device, the user has to turn on the power and boot the OS first. For independent software vendors or vertical application developers, it is costly and unfavorable to ask customers to download new applications themselves.

To solve the above-mentioned problems, a flash file system was developed. While receiving the downloaded applications, programs or data, the flash file system writes them into a flash memory directly or indirectly. Since the flash memory can store data after the power is reset or turned off, the user does not have to download the applications, programs or data again after resetting or turning off the electronic device. However, the flash file system still requires the user to download the applications during the runtime of the OS.

Another approach is to link the applications, programs or data with the OS using a linker to get a linked file, and transform the linked file into a single ROM image. Then, the ROM image is recorded into the ROM of the hand-held electronic device. Being recorded into the ROM, the applications become the built-in application of the hand-held electronic device. Therefore, after turning the hand-held electronic device on, the user can use the applications directly without downloading the applications.

However, using this approach, since the applications and the OS are linked, the applications cannot be separated from the ROM image individually. In other words, when the independent software vendors or the vertical application developers develop a new application, they cannot just delete an old application from the ROM image and add this new application into the ROM image. The independent software vendors or the vertical application developers must start by linking this new application with the OS again. Therefore, they must cooperate with the OS developer, which often delays the application-development schedule and raises the issue of trade secret protection between the OS developers and the independent software vendors or the vertical application developers.

SUMMARY OF THE INVENTION

In view of the above, an objective of the invention is to provide a method and system for composing and decomposing a decomposable ROM image.

To achieve the above objective, the method of composing a decomposable ROM image according to the invention includes creating an OS header for an OS image and a non-OS header for a non-OS image, and sequentially combines the OS header, the OS image, the non-OS header and the non-OS image. The OS header includes OS size information of the OS image. The non-OS header includes non-OS size information of the non-OS image.

The method for decomposing the decomposable ROM image according to the invention includes obtaining OS size information from the OS header, retrieving the OS image from the ROM image according to the OS size information, obtaining non-OS size information from the non-OS header, and retrieving the non-OS image from the ROM image according to the non-OS size information.

The system for composing the decomposable ROM image according to the invention includes a header creator and a combining module. The header creator creates the OS header including the OS size information and the non-OS header including the non-OS size information. The combining module sequentially combines the OS header, the OS image, the non-OS header and the non-OS image.

The system for decomposing the decomposable ROM image includes a header reader and a retriever. The header reader obtains the OS size information from the OS header and the non-OS size information from the non-OS header. The retriever retrieves the OS image and the non-OS image from the ROM image according to the OS size information and the non-OS size information.

According to the invention, when the OS of the hand-held device needs to find a specific non-OS image in the ROM image, the OS first obtains the OS size information from the OS header, and finds the non-OS header next to the OS image according to the OS size information. Then, after setting the non-OS header found as a current header and the non-OS image corresponding to the current header as a current image, the OS checks whether the current image is the specific image. If not, the OS finds the non-OS header next to the current image according to the non-OS size information retrieved from the current header and checks again.

When composing the decomposable ROM image, the system and method according to the invention may check if there exists any non-OS image that is to be composed. If such non-OS image exists, the system and method according to the invention calculates the size of this non-OS image, and creates another non-OS header containing the non-OS size information of this to-be-combined non-OS image. Then, the non-OS header and the non-OS image are sequentially attached to the decomposable ROM image.

The non-OS image may be an application image or a data image.

The OS header may contain number information of the non-OS image combined in the ROM image.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The features, aspects and advantages of the invention will be apparent from the following detailed description, which proceeds with reference to the accompanying drawings, wherein the same references relate to the same elements.

Figure 1:
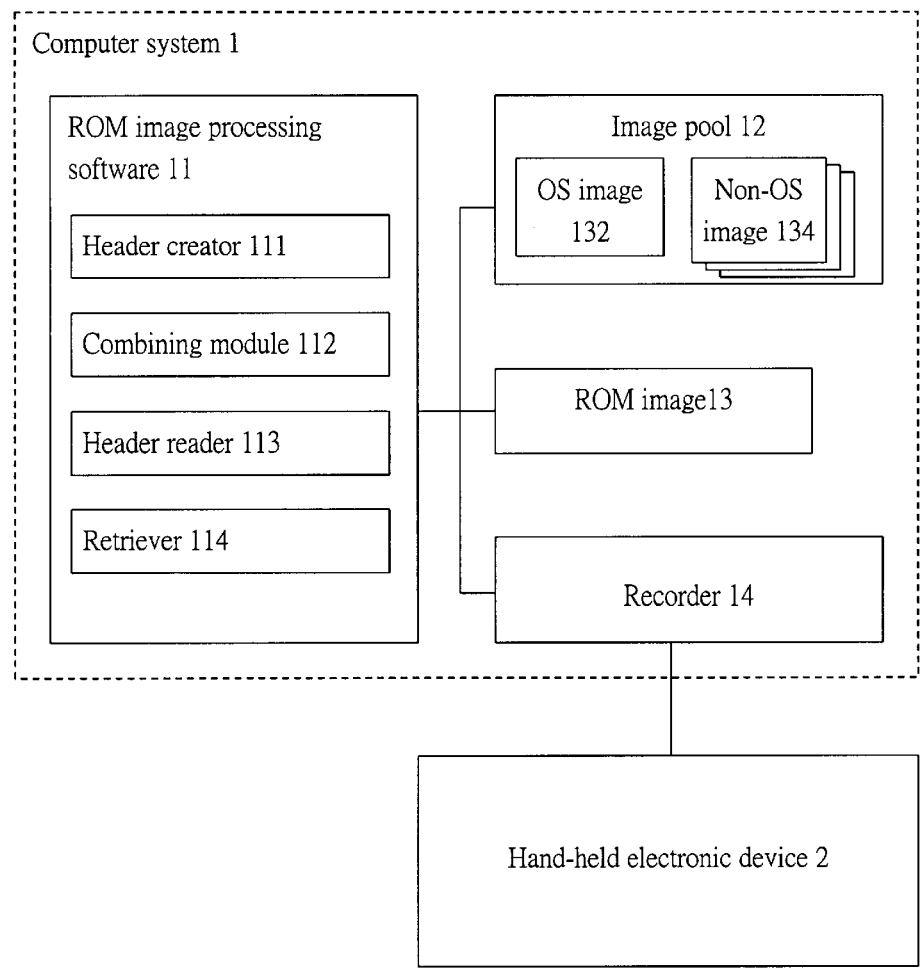
FIG. 1 is a diagram showing a system of composing and decomposing a decomposable ROM image in accordance with a preferred embodiment of the invention.

Referring to FIG. 1, according to a preferred embodiment of the invention, the system for composing and decomposing a decomposable ROM image 13 is implemented as a computer system 1. Except for the ROM image 13, the computer system 1 includes a ROM image processing software 11, an image pool 12 and a recorder 14.

The computer system 1 may have input devices, output devices, storage devices and at least one central processing unit (CPU). The input devices may include a keyboard, a mouse, a digital board or a tracking ball that receives commands, requests or inputs from a user. The output devices may include a CRT display device, a liquid crystal display (LCD) or a plasma display that can display information including messages, icons, graphics or texts. In addition, a network interface such as a modem or a network card, can be used as the I/O device to receive and output data transmitted through a network.

The storage devices generally include high-speed primary storage, such as DRAM and ROM semiconductor devices, and secondary storage in the form of long term storage mediums such as floppy disks, hard disks, CD-ROMs and flash memories. The CPU can be any architecture. For example, it can include an arithmetic logic unit (ALU) to perform arithmetic and logic operations, a register to temporarily store data or instructions, and a control unit to control various operations of the computer system 1.

The ROM image processing software 11 is installed in the computer system 1, and may include many files stored in the secondary storage. When processing the ROM image 13, the CPU loads the necessary files and data, and executes the ROM image processing software 11 according to the requests or instructions received by the input devices.

The image pool 12 stores the OS image 132 and at least one non-OS image 134. When composing or decomposing the ROM image 13, the OS image 132 and the non-OS image 134 are retrieved from or stored in the image pool 12. The term "pool" is a conceptual term, which means the place the images are gathered together in. It can be realized by storing the OS image 132 and the non-OS image 134 in the storage device.

The recorder 14 records the ROM image 13 into the hand-held electronic device 2. That is, after the ROM image processing software 11 finishes composing the ROM image 13, the recorder 14 records the ROM image into the ROM of the hand-held device. The recorder 14 can be any type of data recording device that can record an image into a ROM.

Figure 2:
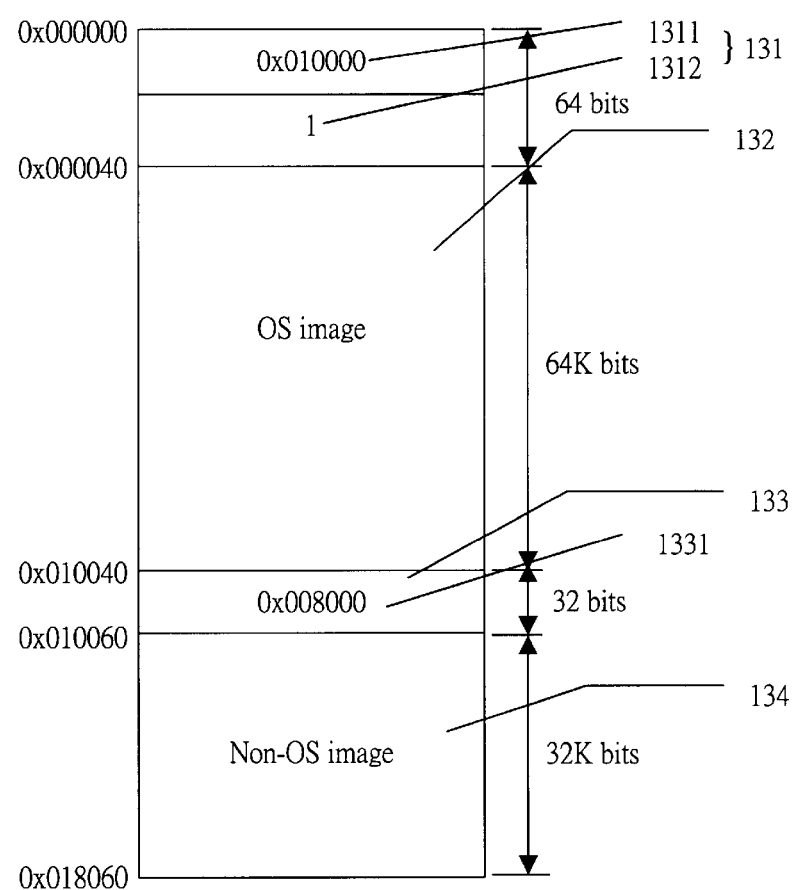
FIG. 2 is a schematic illustration showing the data structure of the ROM image in accordance with the preferred embodiment of the invention.

Referring to FIG. 2, the ROM image 13 according to a preferred embodiment of the invention includes an OS header 131, an OS image 132, a non-OS header 133 and a non-OS image 134. The OS header 131 includes an OS size information 1311 and a number information 1312. The non-OS header 133 includes a non-OS size information 1331.

In the preferred embodiment, the OS size information 1311 refers to the size of the OS image 132, and the non-OS size information 1331 refers to the size of the non-OS 134. For example, the OS header may use 32 bits to store the size of the OS image 132, and 32 bits to store the number of the non-OS images. Since the size of the OS image is 64K bits, the OS size information 1311 stored in the OS header 131 is "0x010000". Similarly, since the size of the non-Os image is 32K bits, the non-OS size information stored in the non-OS header 133 is "0x0080000".

As shown in FIG. 2, the sizes of the OS header 131, the OS image 132, the non-OS header 133 and the non-OS image 134 are 64 bits, 64K bits, 32 bits and 32K bits, respectively. Therefore, the starting addresses of the OS header 131, the OS image 132, the non-OS header 133 and the non-OS image 134 are "0x000000", "0x000040", "0x010040" and "0x010060", respectively.

As shown in FIG. 1, the ROM image processing software 11 according to the preferred embodiment of the invention has many functional program modules, including a header creator 111, a combining module 112, a header reader 113 and a retriever 114.

Figure 3:
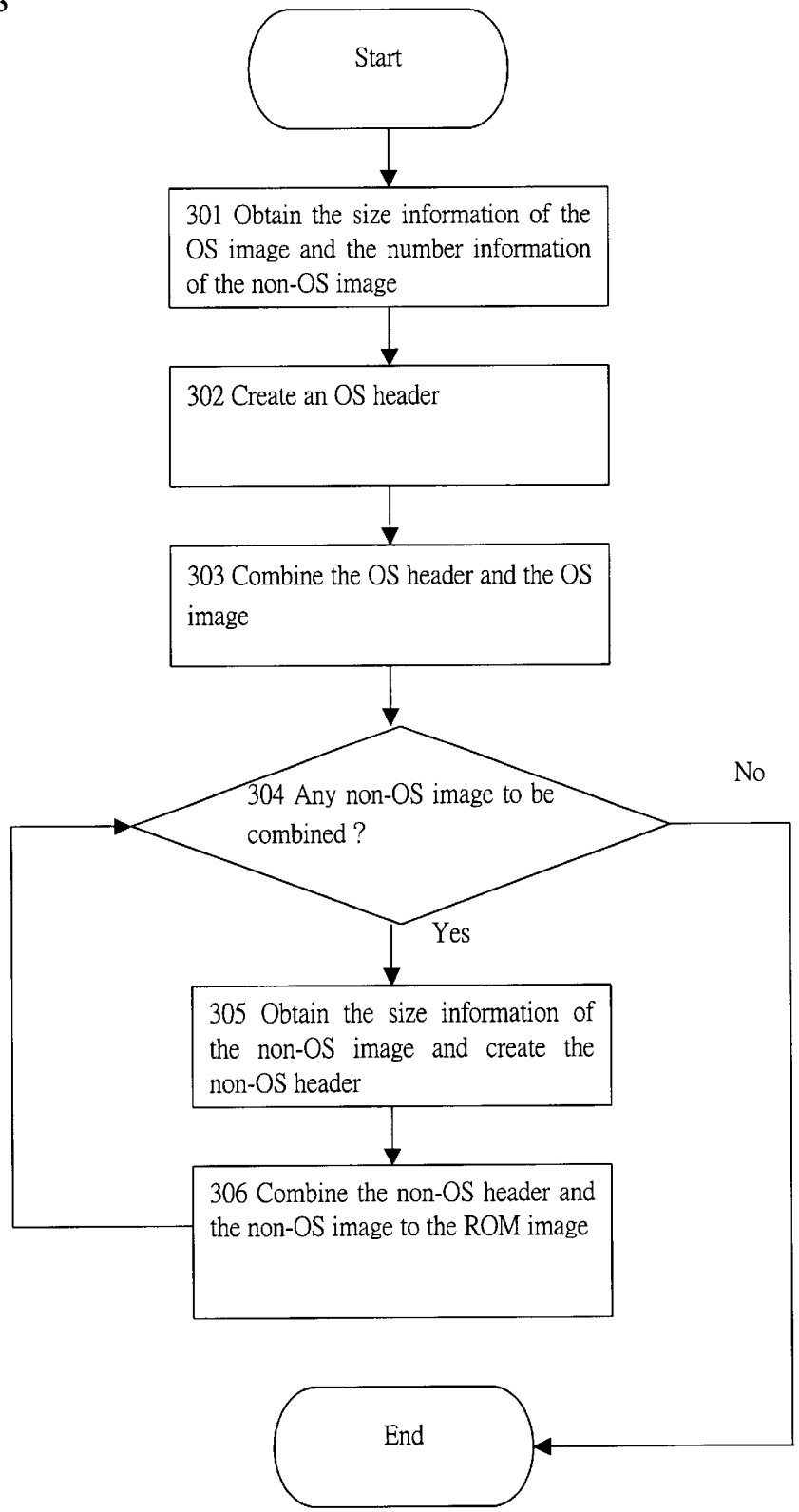
FIG. 3 is a flow chart showing the method for composing the ROM image in accordance with the preferred embodiment of the invention.

Referring to FIG. 3, when composing the ROM image 13, the header creator 111 firstly obtains the size of the OS image and the number of the non-OS images in step 301. Then, in step 302, the header creator 111 creates the OS header 131 containing the OS size information 1311 and the number information 1312.

After the OS header 131 is created, the combining module 112 combines the OS header 131 and the OS image 132 as the first part of the ROM image 13 in step 303. Then, the combining module checks whether there exists any non-OS image that is to be combined in step 304.

If a non-OS image is waiting to be combined, then the header creator 111 obtains the size of this non-OS image, and creates a non-OS header 133 containing the non-OS size information 1331 in step 305. Then, in step 306, the combining module 112 combines the non-OS header 133 and the non-OS image 134, and then attaches the combined non-OS header 133 and non-OS image 134 to the ROM image 13.

After combining the non-OS header and the non-OS image, the combining module 112 performs the step 304 again to check if there exists another non-OS image that is to be combined. In step 304, if there is no non-OS image that waits to be combined, the ROM image composing procedure is ended.

Figure 4:
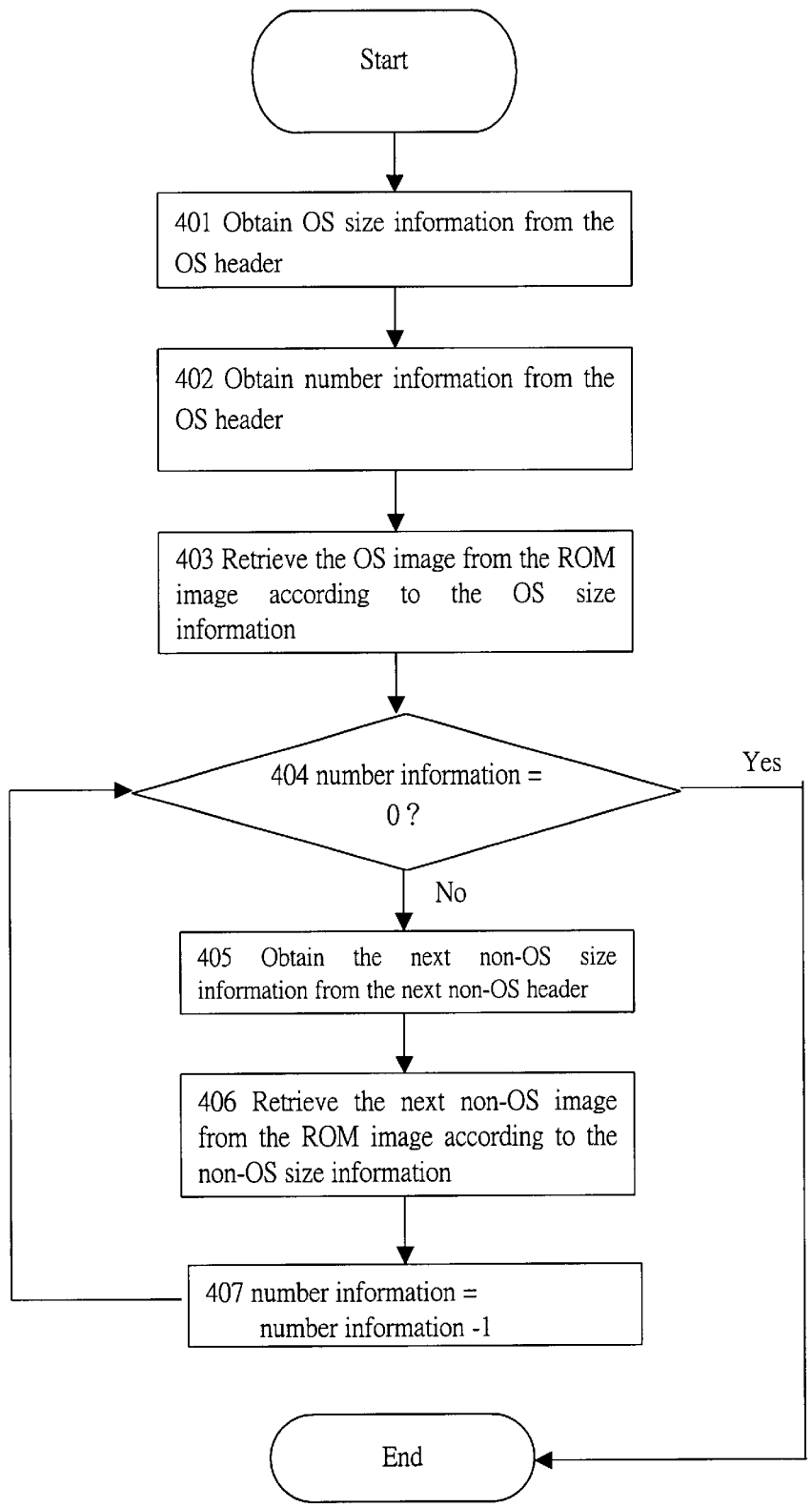
FIG. 4 is a flow chart showing the method for decomposing the ROM image in accordance with the preferred embodiment of the invention.

Referring to FIG. 4, when decomposing a composed ROM image 13, the header reader 113 firstly obtains the OS size information 1311 from the OS header 131 in step 401, and obtains the number information 1312 from the OS header 131 in step 402. Then, the retriever 114 retrieves the OS image from the ROM image 13 according to the OS size information 1311 in step 403.

Since the number information 1312 is obtained, the retriever 114 can check whether there exists any non-OS image left in the ROM image 13 by checking if the number information is 0.

After the above-mentioned steps are finished, the retriever 114 checks if there exists any non-OS image 134 that waits to be retrieved in step 404. If not, the procedure for decomposing the ROM image is ended. If yes, the header reader 113 obtains the non-OS size information of the non-OS image 134 from the next non-OS header in step 405, while the retriever 114 retrieves the corresponding non-OS image 134 according to the non-OS size information 1331 in step 406. After that, the next number information is set to the current number information minus one in step 407, and then the procedure returns to step 404.

Figure 5:
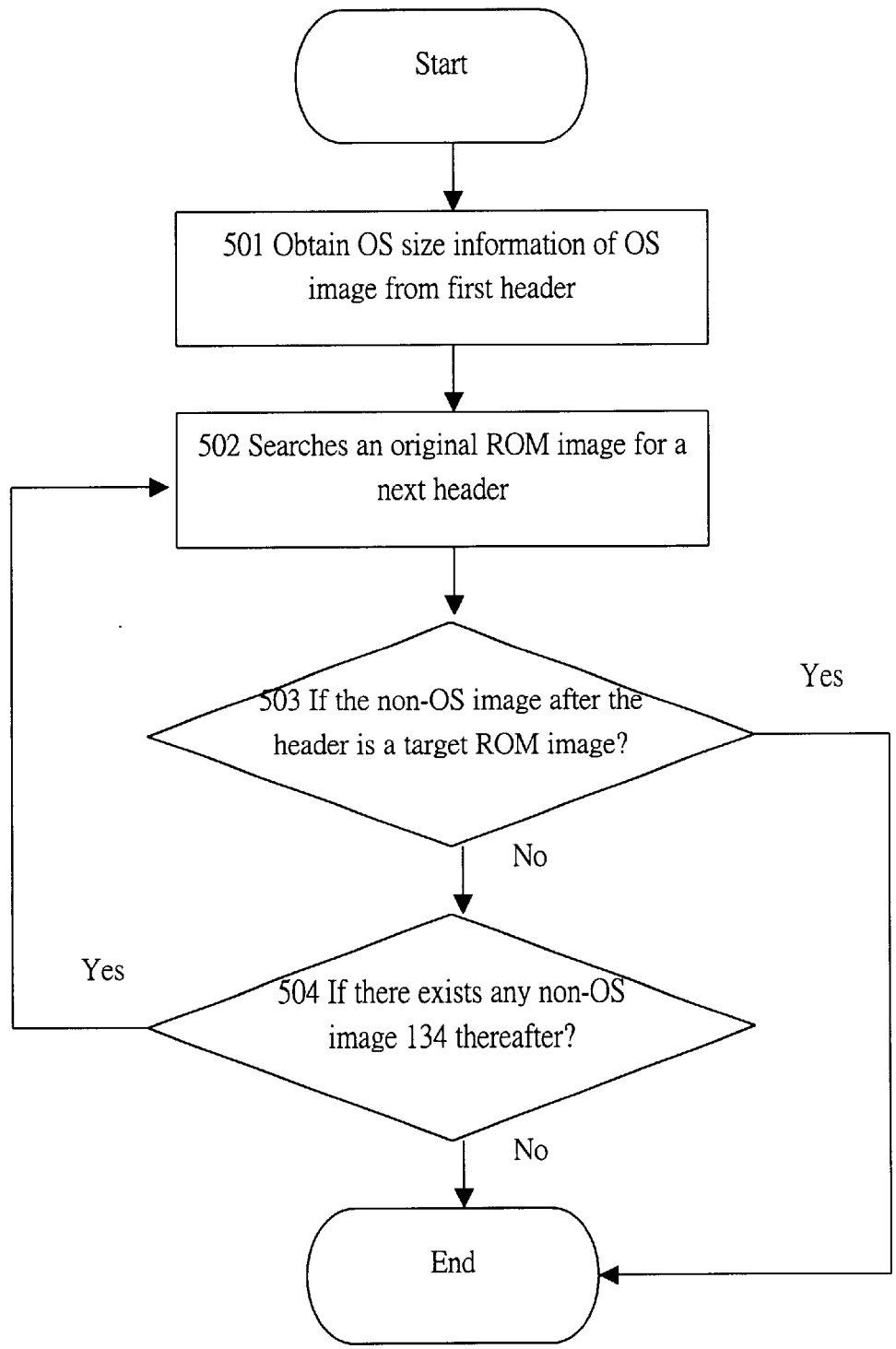
FIG. 5 is a flow chart showing the method for the operation system to search for the target ROM image in accordance with the preferred embodiment of the invention.

In addition, the embodiment of the invention also discloses a system for storing an OS image containing an operation system. As shown in FIG. 5, when searching for a target ROM image from the ROM image 131 containing at least one non-OS image 134, the operation system first obtains the OS size information of the OS image 132 from the OS header 131 in step 501. Next, the operation system searches the ROM image 134 for a next non-OS header according to the OS size information of the OS image 132 in step 502. After finding the next header, the operation system checks if the non-OS image 134 after the header is the target ROM image in step 503. If yes, the search procedure ends. If not, the operation system further checks if there exists any non-OS image 134 thereafter in step 504. If not, the search procedure ends. If yes, the procedure goes back to step 502, and steps 502 to 504 are repeated until the target ROM image is found or until there is no non-OS image 134 thereafter.

To sum up, the system and method of composing and decomposing a decomposable ROM image utilize a special data structure containing a header and its corresponding ROM image to compose and decompose the ROM image. Thus, the OS image and the required non-OS image can be arbitrarily combined according to a requirement of a user. Accordingly, the research, development, and production works of the OS manufacturers of the hand-held electrical device and those of the software vendors can be separated. Thereby, unnecessary costs for system integration can be lowered, the protections of the business know-how among several manufacturers can be enhanced, and the exchanges of the application program and data can also be facilitated.

While the invention has been described with reference to a preferred embodiment, this description is not intended to be construed in a limiting sense. Various modifications of the embodiment will be apparent to persons skilled in the art upon reference to the description. It is therefore intended that the appended claims encompass any such modifications.

What is claimed is:

1. A method of composing a decomposable read-only memory (ROM) image of a hand-held device, the ROM image including an operation system (OS) image and a non-OS image, the method comprising:
   creating an OS header, which includes OS size information of the OS image and number information of the non-OS image to be combined;
   creating a non-OS header, which includes non-OS size information of the non-OS image; and
   sequentially combining the OS header, the OS image, the non-OS header and the non-OS image.

2. The method according to claim 1, wherein the non-OS image is an application image.

3. The method according to claim 1, wherein the non-OS image file is a data image.

4. The method according to claim 1, further comprising:
   obtaining the OS size information and the non-OS size information.

5. The method according to claim 1, further comprising:
   obtaining the number information.

6. The method according to claim 1, further comprising:
   checking if there exists any non-OS image that is to be combined.

7. A method of decomposing a ROM image of a hand-held device, the ROM image sequentially including an OS header corresponding to an OS image, the OS image, a non-OS header corresponding to a non-OS image, and the non-OS image, the method comprising:
   obtaining OS size information from the OS header;
   retrieving the OS image from the ROM image according to the OS size information;
   obtaining non-OS size information from the non-OS header; and
   retrieving the non-OS image from the ROM image according to the non-OS size information,
   wherein the OS header includes number information of the non-OS image in the ROM image.

8. The method according to claim 7, wherein the non-OS image is an application image.

9. The method according to claim 7, wherein the non-OS image is a data image.

10. The method according to claim 7, further comprising:
    obtaining the number information from the OS header.

11. The method according to claim 7 further comprising:
    checking if there exists any non-OS image that is to be decomposed.

12. A system for composing a ROM image of a hand-held device, the ROM image including an OS image and a non-OS image, the system comprising:
    a header creator for creating an OS header and a non-OS header, the OS header including OS size information of the OS image and number information of the non-OS image to be combined, the non-OS header including non-OS size information of the non-OS image; and
    a combining module for sequentially combining the OS header, the OS image, the non-OS header and the non-OS image.

13. The system according to claim 12, wherein the non-OS image is an application image.

14. The system according to claim 12, wherein the non-OS image is a data image.

15. The system according to claim 12, wherein the header creator further obtains the number information of the non-OS image to be combined.

16. The system according to claim 12, wherein the header creator further obtains the OS size information and the non-OS size information.

17. The system according to claim 12, wherein the combining module further checks if there exists any non-OS image that is to be combined.

18. A system of decomposing a ROM image of a hand-held device, the ROM image sequentially including an OS header corresponding to an OS image, the OS image, a non-OS header corresponding to a non-OS image and the non-OS image, the system comprising:
    a header reader for obtaining OS size information from the OS header and non-OS size information from the non-OS header; and a retriever for retrieving the OS image and the non-OS image from the ROM image according to the OS-size information and the non-OS size information, wherein the OS header includes number information of the non-OS image in the ROM image.

19. The system according to claim 18, wherein the non-OS image is an application image.

20. The system according to claim 18, wherein the non-OS image is a data image.

21. The system according to claim 18, wherein the retriever further checks if there exists any non-OS image that is to be decomposed.

22. A method for an OS of a hand-held device to retrieve an specific image in a ROM image, the ROM image sequentially including an OS header, an OS image and a plurality of combinations of a non-OS header and its corresponding non-OS image, the method comprising:

(a) obtaining OS size information from the OS head;

(b) finding the non-OS header next to the OS image according to the OS size information;

(c) setting the non-OS header found as a current header, and the non-OS image corresponding to the current header as a current image;

(d) checking whether the current image is the specific image; and (e) if the current image is not the specific non-OS image, finding the non-OS header next to the current image according to the non-OS size information retrieved from the current header and return to step (c).

23. The method according to claim 22, wherein the non-OS image is an application image.

24. The method according to claim 22, wherein the non-OS image is a data image.

25. The method according to claim 22, wherein the step (e) further comprises:

checking whether the non-OS header next to the current image exists.

* * * * *